United States Patent
Bijigiri et al.

(10) Patent No.: US 12,135,718 B1
(45) Date of Patent: Nov. 5, 2024

(54) WILDCARD CHARACTER SUPPORT IN LOCATION PATH OF FOREIGN TABLE TO ENABLE PATTERN MATCHING

(71) Applicant: Teradata US, Inc, San Diego, CA (US)

(72) Inventors: Srinivas Bijigiri, Bijigiri Sharief (IN); Rama Krishna Venkata Tirunagari, Bangalore (IN)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 18/243,484

(22) Filed: Sep. 7, 2023

(51) Int. Cl.
  *G06F 16/24* (2019.01)
  *G06F 16/22* (2019.01)
  *G06F 16/2455* (2019.01)
  *G06F 16/248* (2019.01)

(52) U.S. Cl.
  CPC .... *G06F 16/24553* (2019.01); *G06F 16/2282* (2019.01); *G06F 16/248* (2019.01)

(58) Field of Classification Search
  CPC ........... G06F 16/24553; G06F 16/2282; G06F 16/248
  See application file for complete search history.

(56) References Cited

U.S. PATENT DOCUMENTS

| | | | |
|---|---|---|---|
| 2018/0189328 A1* | 7/2018 | Frazier | G06F 16/254 |
| 2021/0294869 A1* | 9/2021 | Gedliczka | G06F 16/9566 |

OTHER PUBLICATIONS

Teradata VantageTM—Native Object Store Getting Started Guide, Terminology, docs.teradata.com/r/Teradata-VantageTM-Native-Object-Store-Getting-Started-Guide/January-2021/Welcome-to-Native-Object-Store.
Teradata VantageTM—Native Object Store Getting Started Guide, Terminology, docs.teradata.com/r/Teradata-VantageTM-Native-Object-Store-Getting-Started-Guide/January-2021/Terminology.
Teradata VantageTM—Native Object Store Getting Started Guide, Terminology, docs.teradata.com/r/Teradata-VantageTM-Native-Object-Store-Getting-Started-Guide/January-2021/Writing-Data-to-External-Object-Store/Working-with-Manifest-Files/Creating-a-Manifest-File-Without-Writing-Separate-Objects-to-the-Object-Storage/Example-Create-a-Manifest-File-Using-READ_NOS.
Teradata VantageTM—SQL Data Definition Language Syntax and Examples, Create Foreign Table Syntax, docs.teradata.com/r/Teradata-VantageTM-SQL-Data-Definition-Language-Syntax-and-Examples/July-2021/Table-Statements/CREATE-FOREIGN-TABLE.
Andreas Wittig and Michael Wittig, Amazon Web Services In Action at 225 (Manning Publications Co., 3rd Edition 2023).
Teradata VantageTM—Native Object Getting Started Guide, Working with Manifest Files, docs.teradata.com/r/Teradata-VantageTM-Native-Object-Store-Getting-Started-Guide/July-2021/Writing-Data-to-External-Object-Store/Working-with-Manifest-Files.
docs.aws.amazon.com/AmazonS3/latest/API/API_ListBuckets.html.
docs.aws.amazon.com/AmazonS3/latest/API/API_ListObjectsV2.html.

* cited by examiner

*Primary Examiner* — Loc Tran
(74) *Attorney, Agent, or Firm* — Howard Speight

(57) ABSTRACT

A database system receives a query that includes a reference to a foreign table. The foreign table is used to access an Object Store (OS) outside the database system. The OS stores objects. The objects have path names, which are pointers to the objects. When the foreign table was created one or more wildcards were used to specify the path names for the objects in the OS to be accessed by the query. The database system directing the OS to provide a list containing the path names of the objects in the OS. The database system receiving the list and applying the one or more wildcards to identify the path names of the objects to be accessed by the query. The database system producing a result by executing the query, accessing the objects in the OS identified by the path names of the objects to be accessed by the query.

15 Claims, 5 Drawing Sheets

WILDCARD CHARACTER SUPPORT IN LOCATION PATH OF FOREIGN TABLE TO ENABLE PATTERN MATCHING

BACKGROUND (Note: This application references a number of different publications as indicated throughout the specification by one or more reference numbers within brackets [x]. A list of these publications ordered according to these reference numbers can be found below in the section entitled "References." The Reference section may also list some publications that are not explicitly referenced in this application. Each of these publications, including those that are not explicitly referenced, is incorporated by reference herein.)

The following terminology is used in this disclosure [1][2][3]:

Object and Object Stores

Objects are the discrete units that compose an object store. Objects can be organized with shared names called prefixes.

Every object has a unique key or path. However, many objects might be identified by or share a common path prefix. For example, /a/b/c/d can contain hundreds of objects.

An object store (OS) is a collection of objects that may or may not be related, with all participating objects located in the same bucket or container and may be organized in a hierarchy.

Native Object Store

Native Object Store (NOS) is a capability of Vantage™, provided by Teradata Corporation, that allows the use of standard Structured Query Language (SQL) and application program interfaces (APIs) to search and query comma-separated-value (CSV) datasets, Javascript object syntax (JSON) datasets, and Parquet format datasets located on object storage platforms that are compatible with Amazon Simple Storage Service (S3), Microsoft Azure Blob, and/or Google Cloud Storage and to write data stored on Vantage to such object storage platforms.

Files and Objects

Files and objects can be used interchangeably to describe the components of an object store. Each file or object contains records in which the data itself is held.

Foreign Table

Foreign tables carry information about the location of the external object store, as well as other definitional information, and are the main vehicle within Advanced SQL Engine, provided by Teradata Corporation, for reading external data. A foreign table may support access to the entire object store, or a subset of an object store.

Manifest File

Manifest files are text files that list the paths of objects stored on an external object store that can be read when querying a table. A foreign table may point to a manifest file, which allows the use of the list of objects in the manifest file.

Key and Path

A key in object store data is the unique identifier for an object and may contain several logical levels.

Path names are identifiers or pointers to an object; a path name is the entire key.

A path prefix is a subset of the path. For example, if the path of an object is/td-usgs/bucket/a/b/c/d/object1, then a path prefix can be any of the following, amongst others (note that the region, "td-usgs," and bucket name, "bucket," are part of each of these path prefixes):

td-usgs/bucket/a/b/c
/td-usgs/bucket/a/b
/td-usgs/bucket/a/b/c/d/object1

Records and Rows

Row is a relational concept that refers to part of a table. Record is a logical grouping of values within an object.

For CSV and JSON formatted data, the database will either convert each record into a row, or will convert a record with an array at the top level into a set of rows.

For Parquet formatted data, fields are grouped together (similar to columnar). Then individual field values are converted to a Teradata column value.

Examples of Use of Foreign Tables and Manifest Tables

FIG. 1 illustrates the use of a foreign table to access a single object in an OS. A foreign table 102 may be created using a SQL data definition language (DDL) statement of the form [4] (in the DDL below, square brackets indicate optional parameters, bold capital letters indicate required key words, regular capital letters indicate optional key words, and italics indicate user defined parameters):

CREATE [MULTISET] FOREIGN TABLE table_specification
  [, table_option [, . . . ] ]
  [, external_security_clause]
  [(location_column, {payload_column|data_column_definition})]
USING (
  LOCATION ('external_file_path')
  [PATHPATTERN ('value')]
  [MANIFEST ({'TRUE'|'FALSE' })]
  [ROWFORMAT ('encoding_format')]
  [STOREDAS ({'TEXTFILE'|'PARQUET' })]
  [HEADER ({'TRUE'|'FALSE' })]
  [STRIP_EXTERIOR_SPACES ({'TRUE' | 'FALSE' })]
  [STRIP_ENCLOSING_CHAR ('NONE')]
A
[[,] NO PRIMARY INDEX]
[[,] PARTITION BY COLUMN] [;]

The CREATE FOREIGN TABLE syntax includes the LOCATION parameter 104, which specifies an "external_file_path" or "key," represented by the curve 106, that points to a single object 108 in a bucket or container 110 in an OS 112. The foreign table 102 created using this technique can be used to access object 108.

The OS does not use a hierarchy to store objects [5]. The OS's use of keys allows users to impose a hierarchy. Keys include a prefix delimited by the slash character (/). An example key for object 108 is Sales_Data/2022/April/Store_A/4, which would include the sales data for Store_A for Apr. 4, 2022. This example key has multiple prefixes:

"Sales_Data,"
"Sales_Data/2022,"
"Sales_Data/2022/April," and
"Sales_Data/2022/April/Store_A/."

FIG. 2 illustrates the use of a foreign table to access multiple objects in an OS. Foreign table 202 can point to more than one objects 204 in a bucket or container 206 in an OS 208 that match a LOCATION parameter 210 having a key represented by the curve 212 that includes a PATHPATTERN parameter. In Teradata's Vantage system, the PATHPATTERN parameter acts as a filter to exclude all but the desired objects from among those pointed to by the LOCATION parameter. For example, the LOCATION parameter may point to objects in the set 204, including objects 214, 216, and 218. The PATHPATTERN parameter may filter out object 218, leaving objects 214 and 216 (shown with black fill) as the objects pointed to by the foreign table. Continuing with the example described above, if a key has the form:

Sales_Data/$year/$month/$store/$day,
the PATHPATTERN parameter makes it possible for a SQL statement accessing the foreign table to specify one or more of the key levels that begins with a dollar sign. The key levels that can be programmatically specified are referred to collectively as the "value" for the PATHPATTERN name-value pair. The term "variable" refers to the items between the slashes in the key. In the example above, the variables are $year, $month, $store, and $day. The PATHPATTERN parameter is limited, however, as discussed, along with a solution to overcome the limitation, in the section below regarding Problem 1.

Further, it is possible that the use of an Auto Schema function will cause the foreign table to have an unintended schema. In Teradata's NOS, Auto Schema is invoked on creation of a foreign table when the user does not supply table attributes such as column names, data types, delimiters, file formats, etc. When the foreign table is created under these conditions, the system accesses the objects identified in the LOCATION parameter. In this process, Auto Schema detects the schema of the first object accessed and defines the foreign table with that schema. Subsequently, a SELECT query may produce unexpected or incorrect results when accessing objects through the foreign table that that do not have the same schema. This can be a problem when the first object accessed during foreign table creation does not have the schema of the SELECT query's target object. This problem and its solution is discussed in more detail in the section below regarding Problem 2.

FIG. 3 illustrates the use of a foreign table and a manifest file to access objects in OSs. A manifest file 302 contains an entry for each desired object in an OS. A foreign table 304 uses the manifest file 302 when the MANIFEST parameter in the CREATE FOREIGN TABLE DDL shown above is set to "TRUE". The LOCATION parameter 306 is set to the address of the manifest file 302. The manifest file 302 contains the names of the desired objects in the OSs. In the example shown in FIG. 3, the manifest file contains N names (three are shown, the remainder are represented by the ellipsis) 306a, 20) 306b, . . . , 306N. Name 306a points to object 308 in bucket or container 310, name 306b points to object 312 in bucket or container 314, and name 306N points to object 316 in bucket or container 318. As can be seen, the objects can be in different buckets or containers. Note that in the Teradata Vantage system, a foreign table refers to only one bucket or container. If it is desired to access data in additional buckets, the user can create additional foreign tables and make a union of all or some of the foreign tables. Thus, in the Teradata Vantage system, the objects 308, 312, and 316 would all be in the same bucket or container.

Manifest files require maintenance. If it is desired to add an object to the list referenced by the foreign table, the manifest file must be edited to add a reference to the new object. This is a problem when objects are continuously being added to the OS, as is often the case.

Searching native object stores for categories of objects in a OS is a challenge, especially when data that fits into the category is continuously being added to the OS.

SUMMARY

In one aspect, a method includes a database system receiving a query that includes a reference to a foreign table. The foreign table is used to access an Object Store (OS) outside the database system. The OS stores objects. The objects have path names, which are pointers to the objects. When the foreign table was created one or more wildcards were used to specify the path names for the objects in the OS to be accessed by the query. The database system directing the OS to provide a list containing the path names of the objects in the OS. The database system receiving the list and applying the one or more wildcards to identify the path names of the objects to be accessed by the query. The database system producing a result by executing the query by accessing the objects in the OS identified by the path names of the objects to be accessed by the query.

Implementations may include one or more of the following. The path names of the objects in the OS may have a plurality of logical levels including a container name and a prefix. The wildcards may be applied to the prefix. A first wildcard of the one or more wildcards may apply to a portion of or all of a first logical level of the plurality of logical levels and a second wildcard of the one or more wildcards may apply to a portion of or all of a second logical level of the plurality of logical levels. One of the one or more wildcards may apply to a portion of one of the logical levels. The wildcards may be used to identify objects having a same schema. Directing the OS to provide a list containing the path names of the objects in the OS may include the database system requesting the OS to identify containers owned by the database system and for each container owned by the database system, requesting path names of the objects in the container. Requesting path names of the objects in the container may include making an additional request for path names of the objects in the container after the OS provides a maximum number of path names.

In one aspect, a computer program is recorded on a non-transitory computer-readable tangible medium, the computer program comprising executable instructions, that, when executed, perform a method. The method includes a database system receiving a query that includes a reference to a foreign table. The foreign table is used to access an Object Store (OS) outside the database system. The OS stores objects. The objects have path names, which are pointers to the objects. When the foreign table was created one or more wildcards were used to specify the path names for the objects in the OS to be accessed by the query. The method includes the database system directing the OS to provide a list containing the path names of the objects in the OS. The method includes the database system receiving the list and applying the one or more wildcards to identify the path names of the objects to be accessed by the query. The method includes the database system producing a result by executing the query by accessing the objects in the OS identified by the path names of the objects to be accessed by the query.

Implementations may include one or more of the following. The path names of the objects in the OS may have a plurality of logical levels including a container name and a prefix. The wildcards may be applied to the prefix. A first wildcard of the one or more wildcards may apply to a portion of or all of a first logical level of the plurality of logical levels and a second wildcard of the one or more wildcards may apply to a portion of or all of a second logical level of the plurality of logical levels. One of the one or more wildcards may apply to a portion of one of the logical levels. The wildcards may be used to identify objects having a same schema. Directing the OS to provide a list containing the path names of the objects in the OS may include the database system requesting the OS to identify containers owned by the database system; and for each container owned by the database system, requesting path names of the objects in the container. Requesting path names of the objects in the container may include making an additional request for path names of the objects in the container after the OS provides a maximum number of path names.

In one aspect, a system includes an object store access process comprising at least one process executed by a computer processor. The system includes a database process. The database process receives a query that includes a reference to a foreign table. The foreign table is used to access an Object Store (OS) outside the database system. The OS stores objects. The objects have path names, which are pointers to the objects. When the foreign table was created, one or more wildcards were used to specify the path names for the objects in the OS to be accessed by the query. The object store access process directs the OS to provide a list containing the path names of the objects in the OS. The database process receives the list and applies the one or more wildcards to identify the path names of the objects to be accessed by the query. The database process produces a result by executing the query by accessing the objects in the OS identified by the path names of the objects to be accessed by the query.

Implementations may include one or more of the following. The path names of the objects in the OS may have a plurality of logical levels including a container name and a prefix. The wildcards may be applied to the prefix. A first wildcard of the one or more wildcards may apply to a portion of or all of a first logical level of the plurality of logical levels and a second wildcard of the one or more wildcards may apply to a portion of or all of a second logical level of the plurality of logical levels. One of the one or more wildcards may apply to a portion of one of the logical levels. The wildcards may be used to identify objects having a same schema. Directing the OS to provide a list containing the path names of the objects in the OS may include the object store access process requesting the OS to identify containers owned by the database system and for each container owned by the database system, requesting path names of the objects in the container.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. An element associated with a particular embodiment should not be limited to association with that particular embodiment but should be assumed to be capable of association with any embodiment discussed herein.

An Example Computer System

Figure 4:
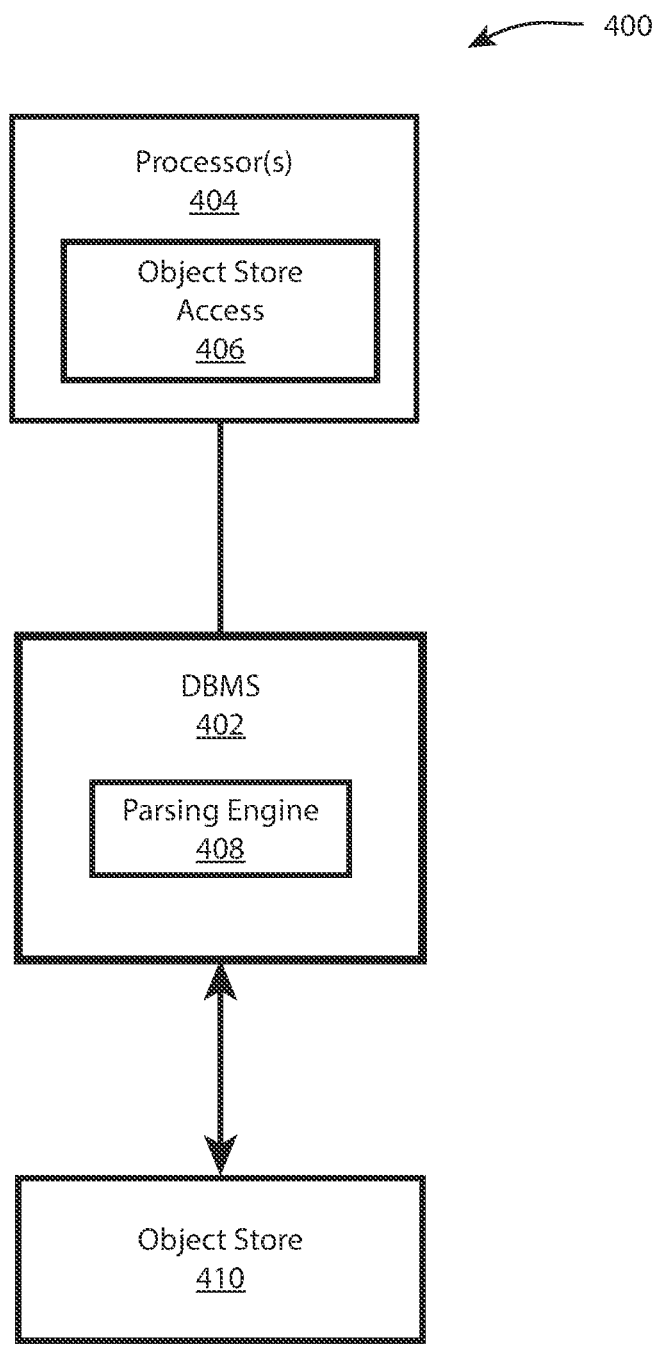
FIG. 4 is one example of a block diagram of a computer system.

The techniques disclosed herein have particular application to, but are not limited to, systems such as the system 400 illustrated in FIG. 4. The system 400 includes a variety of hardware components and software components that may be deployed on an appliance, on commodity hardware, in a private cloud, in a public cloud, in a combination of public and private clouds, and/or in a multi-cloud where cloud users are allowed services from multiple cloud vendors such as Amazon (AWS), Google (GCP), and Microsoft (Azure). The software components are programmed as executable instructions into memory and/or a non-transitory computer-readable medium for execution on the hardware components (including, for example, hardware processors). The system 400 includes one or more network connections; the networks can be wired, wireless, or a combination of wired and wireless.

The system 400 implements, among other things, the processing described below in connection with FIGS. 1-8.

An Example Database Management System

The system 400 includes a Database Management System (DBMS) 402, at least one hardware processor 404, and a non-transitory computer-readable storage medium having executable instructions for an object store access process 406 as disclosed herein. The DBMS 402 may be a relational DBMS (RDBMS) or it may be another variety of database management system.

The DBMS 402 may include a parsing engine 408, discussed below in connection with FIGS. 5 and 6, that organizes the storage of data and the distribution of database table rows and coordinates the retrieval of data from the data-storage facilities in response to queries received from a user. The DBMS 402 usually receives queries and commands to build tables in a standard format, such as Structured Query Language (SQL). The DBMS may provide access to an object store 410 under the control of the native object store access software 406.

Figure 5:
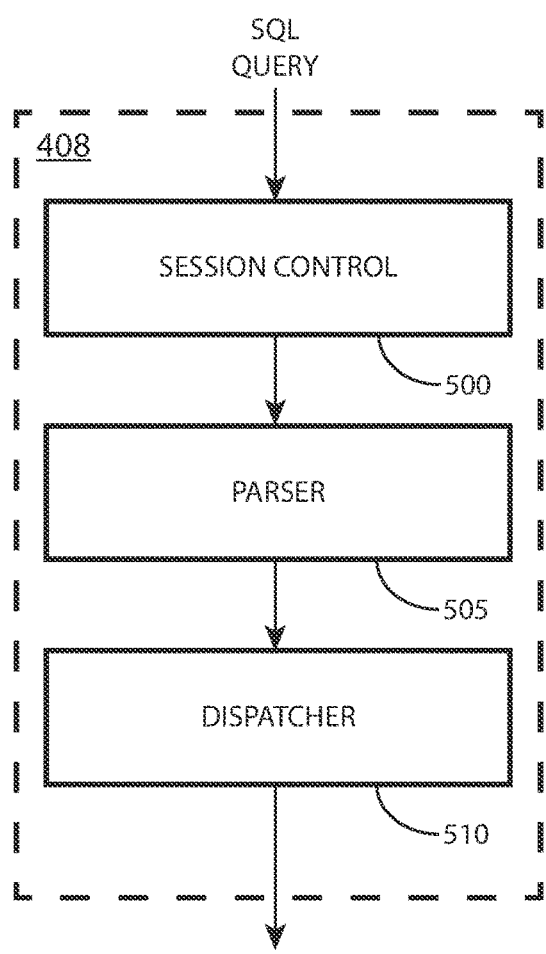
FIG. 5 is one example of a block diagram of a parsing engine.
Figure 6:
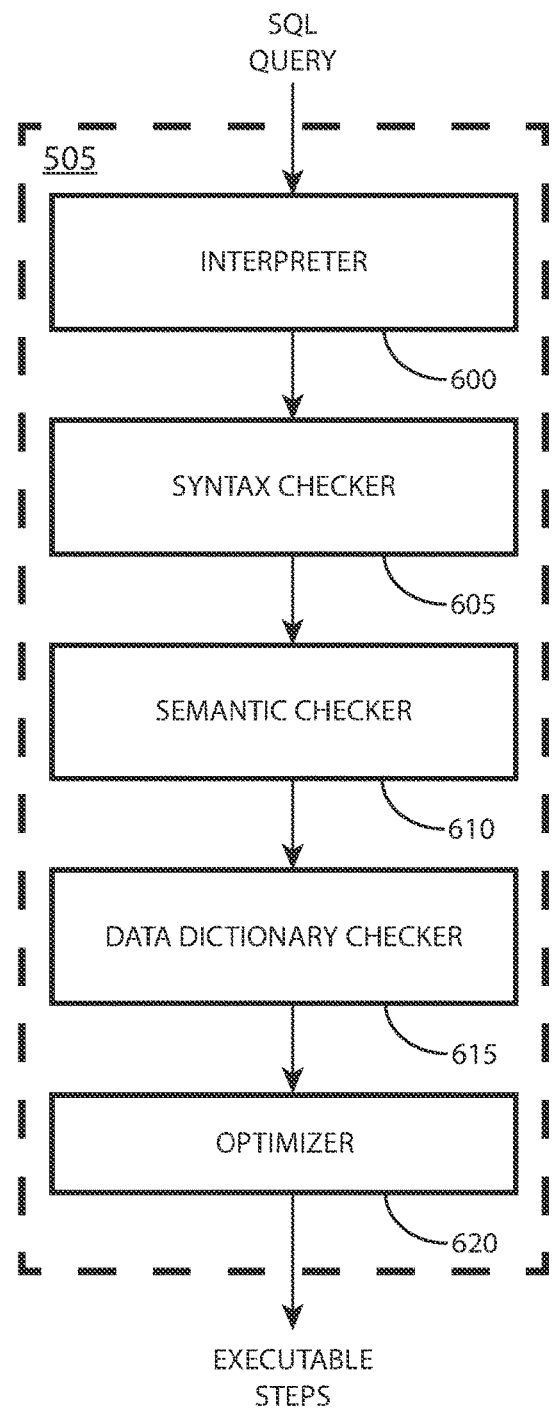
FIG. 6 is one example of a block diagram of a parser.

Once the session control 500, shown in FIG. 5, allows a session to begin, a user may submit a SQL query. More broadly, the user may submit a "request," a term that includes database queries, which are processed by the DBMS to produce an output result, and other DBMS actions, such as load utilities to load data from a source to a target, etc. Typically, a query includes one or more predicates. Query predicates, or logical predicates, are types of conditional expressions that specify a condition of a row or group of rows that has one of three possible states: TRUE, FALSE, or NULL (or unknown).

The SQL query is routed to the parser 505. As illustrated in FIG. 6, the parser 505 interprets the SQL query 600, checks it for proper SQL syntax 605, evaluates it semantically 610, and consults a data dictionary to ensure that all the objects specified in the SQL query actually exist and that the user has the authority to perform the request 615. Finally, the parser 505 runs an optimizer 620, which develops a query execution plan (QEP) to perform the query and produces executable steps to execute the QEP. A dispatcher 510 issues commands to implement the executable steps.

Wildcard Characters in the LOCATION Field of a Foreign Table

The techniques described herein support wildcard characters in the LOCATION name-value pair (NVP) of a foreign table so that a wildcard character can be mentioned in place of an entire object key or part of object key instead of a constant object key in the path. By doing so, a user gets more flexibility in creating foreign tables as per the requirement during table creation itself by pattern matching object keys fully or partially, instead of creating various views with path filtering conditions on top of a foreign table.

The wildcard approach described herein can represent homogeneous data (data of same schema) that exists in different paths using a single foreign table even when data is flowing continuously into the OS. The current manifest file approach can also represent data of multiple different locations, but the user is required to add entries explicitly in the manifest file. It is difficult to add entries in a manifest file when data files are getting added continuously or more frequently. As there are many scenarios where data continuously floods into an OS, capturing that growing data is a challenge.

The techniques described herein also improve the likelihood that the foreign table doesn't represent unintended data schemas in cases where LOCATION represents files of multiple schemas when Auto Schema is in place. These techniques address the issue by mentioning the detailed path in the LOCATION and using wildcard characters except for the portion of the object key which represents desired data. Current implementations force the use of a full path up to the bucket/high level directory name to enable path filtering. In this case, the Auto Schema framework may point the foreign table to an unintended data schema as Auto Schema chooses the schema of a file as valid which it first (or some other criteria) encounters in processing that may not be the same as the schema of the desired file.

Apart from using wildcard characters in place of a whole object key (i.e., a subdirectory), the techniques support wildcard characters within an object key. This solves certain other use cases. For example, the wildcard character approach will work where desired object keys/files have same suffix as part of their name, but the prefix might differ. To represent those set files by a single foreign table, the techniques use a wildcard followed by suffix as object key in the location path.

The techniques described herein support wildcard characters such as '*', '?' (Unix format) or ' %', '_' (Teradata SQL format) as part of the LOCATION path of a foreign table so that the user can define pattern matching during foreign table creation. This enables the foreign table to point only at intended data. By doing so, it is possible to avoid or minimize path filtering conditions in the actual business queries so that queries become much simpler. The users also will have maximum control on the data that should be represented by a foreign table. The user can perform full or partial pattern matching in the path at every object key level. This opens opportunities for the user to create foreign tables to represent multiple combinations of data.

Consider the following object store paths:
 . . . /Sales_Data/1990/Jan/Store_A/Day 1.csv
 . . . /Sales_Data/1991/Feb/Store_A/Day1.csv/Sales
 . . . /Sales_Data/2022/Dec/Store_A/Day 1.csv Assume the user wants to create a foreign table to represent only historical orders data of 1990's decade for Store_A. Without the wildcard technique described herein, this goal can be achieved by defining a view with path filtering and foreign table representing till Sales_Data bucket and defining path pattern:
  LOCATION ('/s3/s3.amazonaws.com/Sales_Data/')
  PATHPATTERN ('$Year/$Month/$Store/$Day')
  Query: CREATE VIEW<view name>AS
  SELECT*FROM foreign_tab
  WHERE $PATH.$Store='Store_A'; AND
  $PATH.$Year like '199_';

With the wildcard approach described herein, the same result can be achieved by using wildcards in the location parameter when the foreign table is created, as shown below:
  LOCATION ('/s3/s3.amazonaws.com/Sales_Data/199?/*/Store_A/*/')

As can be seen, wildcards are used in all but the key segment specifying the name of the store.

The wildcard approach is useful in addressing each of the following problems.

Problem 1

Consider the following objects stored in an OS.
 . . . /Sales_Data/2021/Jan/Store_A/Day1.csv/Sales
 . . . /Sales_Data/2021/Feb/Store_A/Day1.csv
 . . . /Sales_Data/2022/Jan/Store_A/Day1.csv
 . . . /Sales_Data/2021/Jan/Store_B/Day1.csv
 . . . /Sales_Data/2021/Feb/Store_B/Day1.csv/Sales
 . . . /Sales_Data/2022/Jan/Store_B/Day1.csv Note that, while the paths of the objects listed above imply hierarchy, objects are stored on the OS without hierarchy. Thus, the OS does not provide a way to, for example, access only the Store_A data (the first three objects in the list above).

Figure 1:
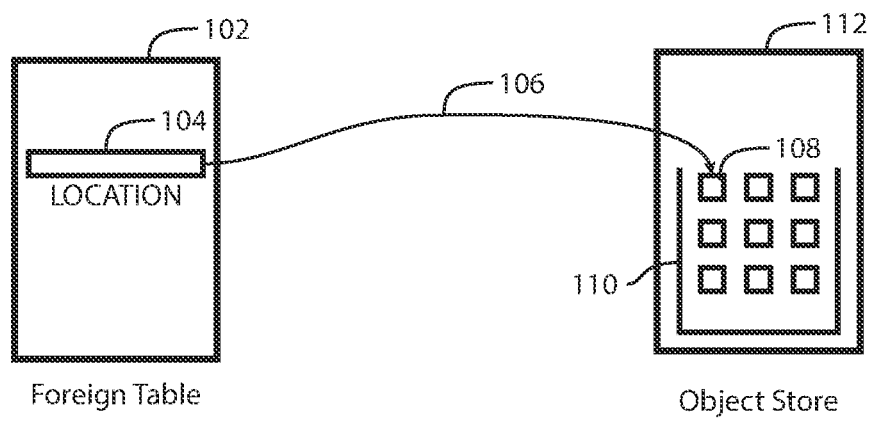
FIG. 1 illustrates the use of a foreign table to access a single object in an OS.
Figure 2:
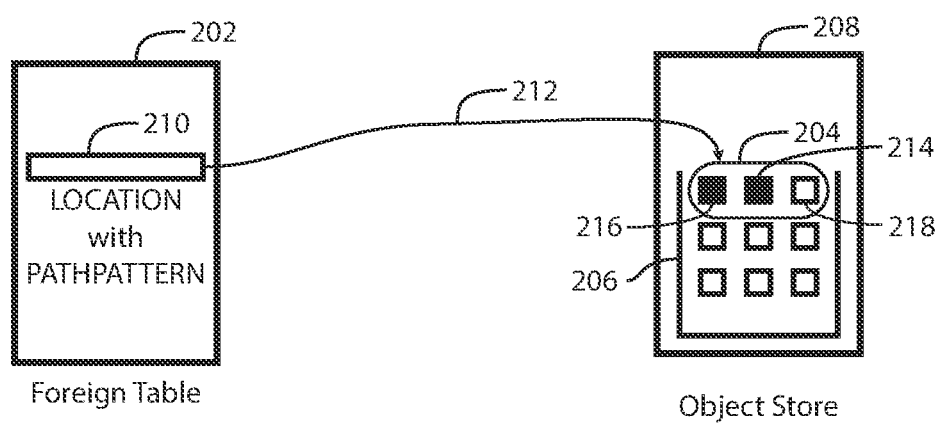
FIG. 2 illustrates the use of a foreign table to access multiple objects in an OS.
Figure 3:
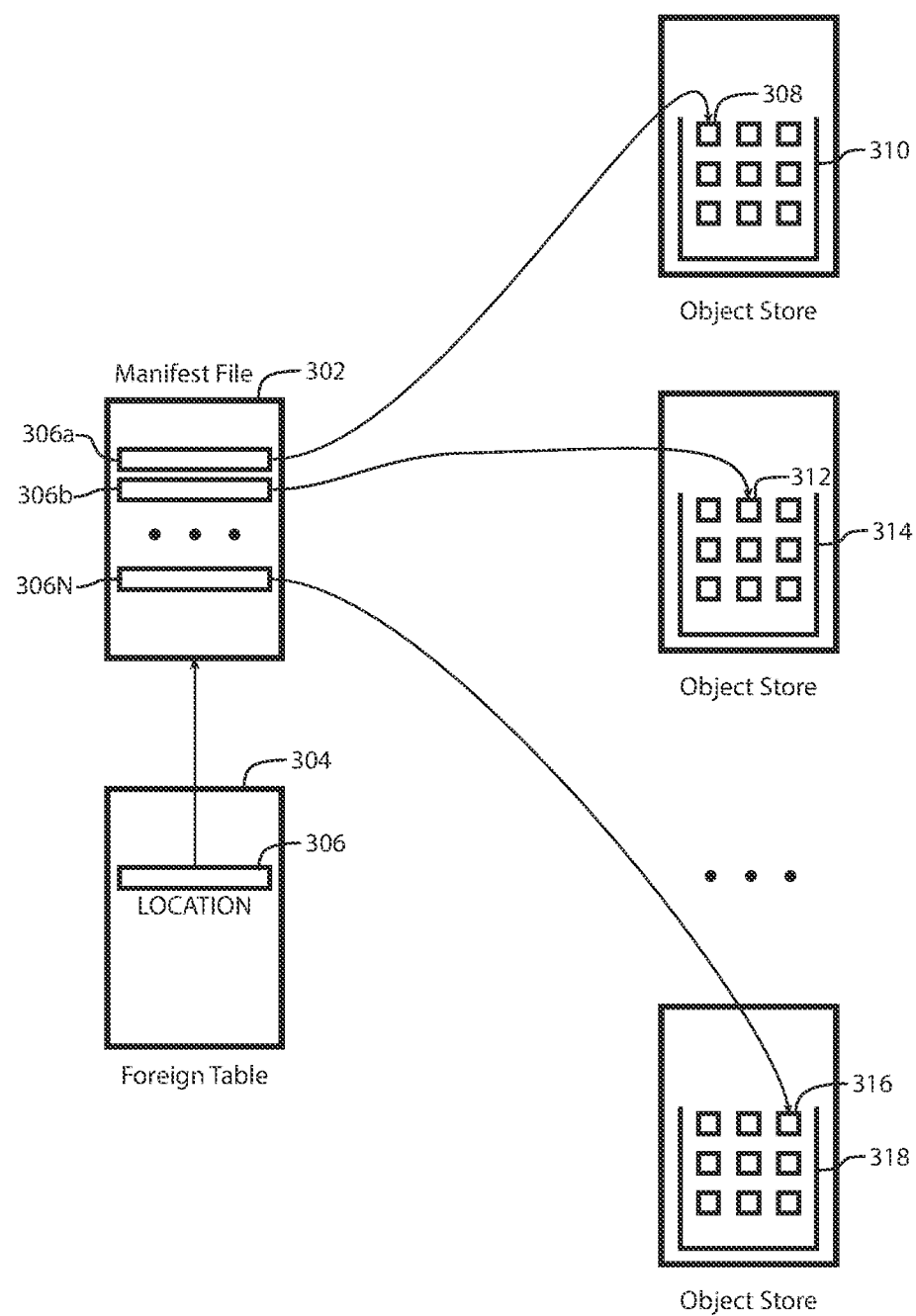
FIG. 3 illustrates the use of a foreign table and a manifest file to access objects in multiple native object stores.

If the user wants to access only Store_A data across all months/years, this can be done with a SELECT statement in a query (e.g., SELECT*FROM Sales_Data WHERE $path.$store='Store_A', where Sales_Data is a foreign file that points to the objects listed above). This adds complexity to queries. Alternatively, as Store_A is present across multiple S3 paths, a foreign table that employs a manifest file listing the desired objects can be created. An example of use of a manifest file is shown in FIG. 3. One disadvantage with this approach is that it is necessary to append an entry in manifest file every time a file is added into any of the desired paths, which, as discussed above, requires creation of a new manifest file.

Solution to Problem 1

If the user wants Store_A data across the year 2022, the following LOCATION path can be used:
  LOCATION('S3/S3.amazonaws.com/Sales_Data/2022/*/Store_A/')

If the user wants Store_A data for all years, the following LOCATION path can be used:
  LOCATION('S3/S3.amazonaws.com/Sales_Data/*/*/Store_A/')

Other Similar User Cases can be Identified:

1) Store_B data for the month of Jan for all the years:
  LOCATION('S3/S3.amazonaws.com/Sales_Data/*/Jan/Store_B/')

2) Store_B data on a specific strategic day across all years (e.g., on a Christmas day):
  LOCATION('S3/S3.amazonaws.com/Sales_Data/*/Dec/Store_B/Day25.csv')

3) The data from all stores on a specific strategic day across all years (e.g., on a Christmas day):
  LOCATION('S3/S3.amazonaws.com/Sales_Data/*/Dec/*/Day25.csv')

4) The data from all stores on a specific strategic day of a specific year (e.g., Thanksgiving Day 2021):
LOCATION('S3/S3.amazonaws.com/Sales_Data/2021/Nov/*/Day25.csv')

5) Extract Data of all the stores that are in specific country on a specific strategic day of a specific year (e.g., Thanksgiving Day 2021), (assuming another level specifying the country in the object naming convention):
LOCATION('S3/S3.amazonaws.com/Sales_Data/America/2021/Nov/*/Day25.csv')

It is possible to identify more use cases as more levels become present in the S3 object key/directory structure. As the complexity of the object naming convention increases, foreign tables can be created for more use cases.

Problem 2

When the foreign table's LOCATION path represents files with multiple schemas, Auto Schema chooses only one schema based on the file that it encounters first (or some criteria) in the processing and skips remaining files which have other schemas. Hence, it cannot be guaranteed that Auto Schema will choose the schema intended by the user for the foreign table that the user is creating. For example, assume the following object paths exist in an OS which represent sales data of a retail company:
Sales_Data/year/month/Store/Orders/Day 1.csv
Sales_Data/year/month/Store/Inventory/Day 1.csv
Sales_Data/year/month/Store/Customer/Day 1.csv To enable path filtering, the contemporary technique is to define the foreign table LOCATION path up to the high level object key/bucket such as Sales_Data with following path pattern:
LOCATION ('/s3/s3.amazonaws.com/Sales_Data/')
PATHPATTERN ('$Year/$Month/$Store/$Day')

With this LOCATION path, Auto Schema may choose the Day 1.csv file either in the 'Orders' object key path, the 'Inventory' key path, or in the 'Customer' object key path. It chooses data of one schema and skips files of other schemas. The user intends for the foreign table to be created for one schema and Auto Schema might choose a different schema.

Solution to Problem 2 Using the Wildcard Approach

If it is desired to create a table only for Orders data of 2022 year, the user can specify the LOCATION path as shown below using wildcard characters:
LOCATION (' . . . /Sales_Data/2022/*/*/Orders/')

This will result in selection of only the . . . /Orders/Day 1.csv object.

Using Wildcard Characters as Part of a Single Object Key

The techniques disclosed herein support wildcard characters within an object key (as opposed to replacing an entire key) so that more granular pattern matching can be achieved which in turn makes simple solutions to many other use cases.

Assume object keys have the names as below:
20200101_transactiondata/file1.csv
20200102_inventorydata/file1.csv
20200201_transactiondata/file2.csv
20200202_inventorydata/file1.csv To create a foreign table that represents transaction data but not inventory data, without using views and explicit path filtering, wildcard characters may be used as part of object key as shown below:
LOCATION (' . . . /Sales_data/*transactiondata/')

To extend the same use case further, assume there are files with multiple file formats such as pdf, jpeg, or json etc. along with csv files in the target location. In this case, to filter for transaction-data-specific files and having only csv format, the path can be defined as below using wildcard characters:
LOCATION(' . . . /Sales_Data/*transactiondata/*.csv')

In this example, a first wildcard applies to a portion of one of the logical levels (i.e., "*transactiondata") and a second wildcard applies to a portion of a portion of a different logical level (i.e., "*.csv").

Implementing Wildcard Support in Reading Objects from Native Object Stores

Figure 7:
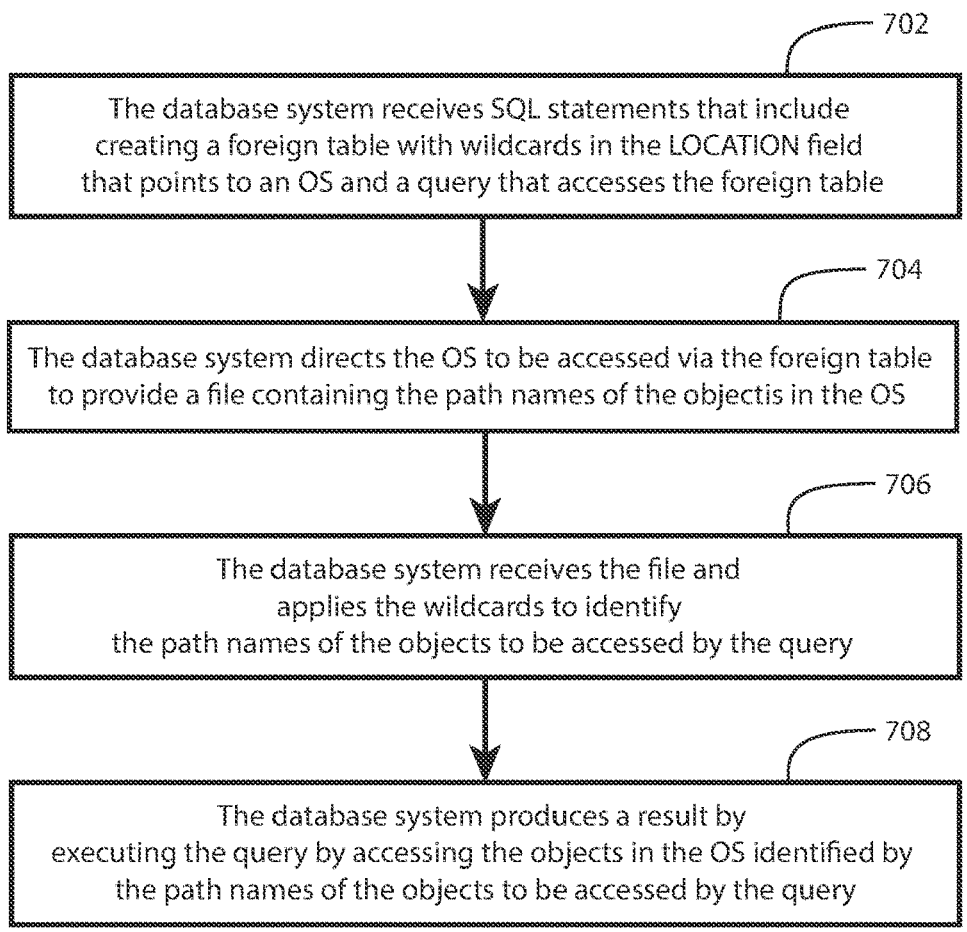
FIG. 7 illustrates an example technique by which wildcards may be applied to retrieving objects from a native object store.
Figure 8:
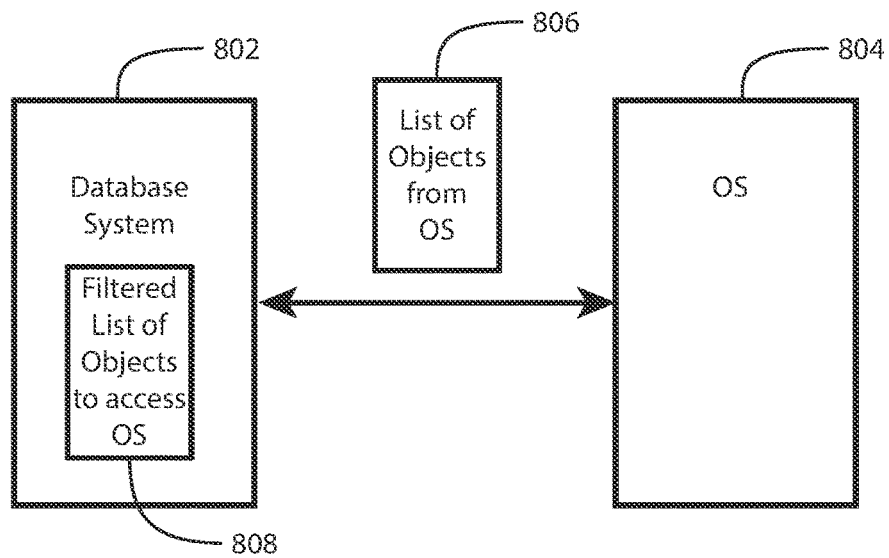
FIG. 8 illustrates example interactions between a database system and a native object store.

As mentioned above, it is challenging to apply wildcards in an OS that does not store objects hierarchically or that provides only limited wildcard support in searching, such as Amazon's S3 OS. FIG. 7 illustrates an example technique by which wildcards may be applied to retrieving objects from a native object store. FIG. 8 illustrates example interactions between a database system and a native object store.

The database system 802 receives a set of SQL statements that include creating a foreign table with wildcards in the LOCATION field that points to an OS 804 and a query that accesses the foreign table 702. This can include DDL similar to that described above to create a foreign table.

The database system 802 (or the object store access process 406) directs the OS 804 to provide a list 806 containing the path names of the objects in the OS 704. This may involve several steps. In Amazon S3, for example, the database system 802 may use the ListBuckets command to request a list of buckets owned by the database system. The database system 802 will then decide which of the buckets from among those listed to query regarding their contents. The database system 802 may choose to request lists for some or all of the buckets.

For each bucket, the database system 802 may use the Amazon S3 ListObjectsV2 command [8] to request a list of the objects in that bucket. Again, this may involve several steps. The ListOjectsV2 command will return a list of up to 1000 objects in the specified bucket. If there are more than 1000 objects in the bucket, it may be necessary to repeat the ListObjectsV2 command, using the "start-after" parameter to specify the last object key received in succeeding iterations of the command.

Further, if it is known that the objects desired to be listed have a specific prefix, the objects returned using the ListObjectsV2 command may be limited using the "prefix" parameter.

The database system 802 compiles the list 806 from the lists of objects returned from the ListObjectsV2 command.

If the objects come from only a single bucket and number fewer than 1000, this process may reduce to a single application of the ListObjectsV2 command. The process described above allows for processing objects from multiple buckets and/or numbering greater than 1000. The process also assumes, for the case with objects in multiple buckets, a foreign table that can specify multiple buckets.

The database system 802 receives the list 806 and applies the wildcards to identify the path names of the objects to be accessed by the query 706. This is done by finding objects whose path names match the pattern set by the wildcards, as described above in the discussion of the problems addressed by the techniques described herein.

The database system 802 produces a result by executing the query by accessing the objects in the OS identified by the path names of the objects to be accessed by the query 708.

Further examples consistent with the present teaching are set out in the following numbered clauses.

Clause 1. A method comprising:
a database system receiving a query that includes a reference to a foreign table, wherein the foreign table is used to access an Object Store (OS) outside the database system, wherein the OS stores objects, wherein the objects have path names, which are pointers to the objects, and wherein when the foreign table was created one or more wildcards were used to specify the path names for the objects in the OS to be accessed by the query;

the database system directing the OS to provide a list containing the path names of the objects in the OS;

the database system receiving the list and applying the one or more wildcards to identify the path names of the objects to be accessed by the query; and the database system producing a result by executing the query by accessing the objects in the OS identified by the path names of the objects to be accessed by the query.

Clause 2. The method of clause 1 wherein:

the path names of the objects in the OS have a plurality of logical levels including:
 a container name, and
 a prefix;
wherein the wildcards are applied to the prefix.

Clause 3. The method of clause 2 wherein a first wildcard of the one or more wildcards applies to a portion of or all of a first logical level of the plurality of logical levels and a second wildcard of the one or more wildcards applies to a portion of or all of a second logical level of the plurality of logical levels.

Clause 4. The method of clause 2 wherein one of the one or more wildcards applies to a portion of one of the logical levels.

Clause 5. The method of any of the preceding clauses wherein the wildcards are used to identify objects having a same schema.

Clause 6. The method of any of the preceding clauses wherein directing the OS to provide the list containing the path names of the objects in the OS comprises:

the database system requesting the OS to identify containers owned by the database system; and for each container owned by the database system, requesting path names of the objects in the container.

Clause 7. The method of any of clause 6 wherein requesting path names of the objects in the container comprises:

making an additional request for path names of the objects in the container after the OS provides a maximum number of path names.

Clause 8. A non-transitory computer-readable tangible medium, on which is recorded a computer program, the computer program comprising executable instructions, that, when executed, perform a method comprising:

a database system receiving a query that includes a reference to a foreign table, wherein the foreign table is used to access an Object Store (OS) outside the database system, wherein the OS stores objects, wherein the objects have path names, which are pointers to the objects, and wherein when the foreign table was created one or more wildcards were used to specify the path names for the objects in the OS to be accessed by the query;

the database system directing the OS to provide a list containing the path names of the objects in the OS;

the database system receiving the list and applying the one or more wildcards to identify the path names of the objects to be accessed by the query; and the database system producing a result by executing the query by accessing the objects in the OS identified by the path names of the objects to be accessed by the query.

Clause 9. The non-transitory computer-readable tangible medium of clause 8 wherein:

the path names of the objects in the OS have a plurality of logical levels including:
 a container name, and
 a prefix;
wherein the wildcards are applied to the prefix.

Clause 10. The non-transitory computer-readable tangible medium of clause 9 wherein a first wildcard of the one or more wildcards applies to a portion of or all of a first logical level of the plurality of logical levels and a second wildcard of the one or more wildcards applies to a portion of or all of a second logical level of the plurality of logical levels.

Clause 11. The non-transitory computer-readable tangible medium of clause 9 wherein one of the one or more wildcards applies to a portion of one of the logical levels.

Clause 12. The non-transitory computer-readable tangible medium of any of clauses 8-11 wherein the wildcards are used to identify objects having a same schema.

Clause 13. The non-transitory computer-readable tangible medium of any of clauses 8-12 wherein directing the OS to provide a list containing the path names of the objects in the OS comprises:

the database system requesting the OS to identify containers owned by the database system; and for each container owned by the database system, requesting path names of the objects in the container.

Clause 14. The non-transitory computer-readable tangible medium of clause 13 wherein requesting path names of the objects in the container comprises:

making an additional request for path names of the objects in the container after the OS provides a maximum number of path names.

Clause 15. A system comprising:

an object store access process comprising at least one process executed by a computer processor;

a database process;

the database process receiving a query that includes a reference to a foreign table, wherein the foreign table is used to access an Object Store (OS) outside the database system, wherein the OS stores objects, wherein the objects have path names, which are pointers to the objects, and wherein when the foreign table was created one or more wildcards were used to specify the path names for the objects in the OS to be accessed by the query;

the object store access process directing the OS to provide a list containing the path names of the objects in the OS;

the database process receiving the list and applying the one or more wildcards to identify the path names of the objects to be accessed by the query; and the database process producing a result by executing the query by accessing the objects in the OS identified by the path names of the objects to be accessed by the query.

Clause 16. The system of clause 15 wherein:

the path names of the objects in the OS have a plurality of logical levels including:
 a container name, and
 a prefix;
wherein the wildcards are applied to the prefix.

Clause 17. The system of clause 16 wherein a first wildcard of the one or more wildcards applies to a portion of or all of a first logical level of the plurality of logical levels and a second wildcard of the one or more wildcards applies to a portion of or all of a second logical level of the plurality of logical levels.

Clause 18. The system of clause 16 wherein one of the one or more wildcards applies to a portion of one of the logical levels.

Clause 19. The system of any of clauses 15-18 wherein the wildcards are used to identify objects having a same schema.

Clause 20. The system of any of clauses 15-19 wherein directing the OS to provide a list containing the path names of the objects in the OS comprises:
 the object store access process requesting the OS to identify containers owned by the database system; and
 for each container owned by the database system, requesting path names of the objects in the container.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Teradata Vantage™—Native Object Store Getting Started Guide, Terminology, docs.teradata.com/r/Teradata-Vantage™-Native-Object-Store-Getting-Started-Guide/January-2021/Welcome-to-Native-Object-Store.
[2] Teradata Vantage™—Native Object Store Getting Started Guide, Terminology, docs.teradata.com/r/Teradata-Vantage™-Native-Object-Store-Getting-Started-Guide/January-2021/Terminology.
[3] Teradata Vantage™—Native Object Store Getting Started Guide, Terminology, docs.teradata.com/r/Teradata-Vantage™—Native-Object-Store-Getting-Started-Guide/January-2021/Writing-Data-to-External-Object-Store/Working-with-Manifest-Files/Creating-a-Manifest-File-Without-Writing-Separate-Objects-to-the-Object-Storage/Example-Create-a-Manifest-File-Using-READ NOS.
[4] Teradata Vantage™—SQL Data Definition Language Syntax and Examples, CREATE FOREIGN TABLE Syntax, docs.teradata.com/r/Teradata-Vantage™-SQL-Data-Definition-Language-Syntax-and-Examples/July-2021/Table-Statements/CREATE-FOREIGN-TABLE.
[5] Andreas Wittig and Michael Wittig, Amazon Web Services In Action at 225 (Manning Publications Co., $3^{rd}$ Edition 2023).
[6] Teradata Vantage™—Native Object Getting Started Guide, Working with Manifest Files, docs.teradata.com/r/Teradata-Vantage™-Native-Object-Store-Getting-Started-Guide/July-2021/Writing-Data-to-External-Object-Store/Working-with-Manifest-Files.
[7] docs.aws.amazon.com/AmazonS3/latest/API/API_ListBuckets.html.
[8] docs.aws.amazon.com/AmazonS3/latest/API/API_ListObjectsV2.html.

What is claimed is:

1. A method comprising:
 a database system receiving a query that includes a reference to a foreign table,
  wherein the foreign table is used to access an Object Store (OS) outside the database system,
  wherein the OS stores objects, wherein the objects have path names, which are pointers to the objects, and
  wherein when the foreign table was created one or more wildcards were used to specify the path names for the objects in the OS to be accessed by the query;
 the database system directing the OS to provide a list containing the path names of the objects in the OS by:
  the database system requesting the OS to identify containers owned by the database system, and
  for each container owned by the database system, requesting path names of the objects in the container and making an additional request for path names of the objects in the container after the OS provides a maximum number of path names;
 the database system receiving the list and applying the one or more wildcards to identify the path names of the objects to be accessed by the query; and
 the database system producing a result by executing the query by accessing the objects in the OS identified by the path names of the objects to be accessed by the query.

2. The method of claim 1 wherein:
 the path names of the objects in the OS have a plurality of logical levels including:
  a container name, and
  a prefix;
 wherein the wildcards are applied to the prefix.

3. The method of claim 2 wherein a first wildcard of the one or more wildcards applies to a portion of or all of a first logical level of the plurality of logical levels and a second wildcard of the one or more wildcards applies to a portion of or all of a second logical level of the plurality of logical levels.

4. The method of claim 2 wherein one of the one or more wildcards applies to a portion of one of the logical levels.

5. The method of claim 1 wherein the wildcards are used to identify objects having a same schema.

6. A non-transitory computer-readable tangible medium, on which is recorded a computer program, the computer program comprising executable instructions, that, when executed, perform a method comprising:
 a database system receiving a query that includes a reference to a foreign table,
  wherein the foreign table is used to access an Object Store (OS) outside the database system,
  wherein the OS stores objects, wherein the objects have path names, which are pointers to the objects, and wherein when the foreign table was created one or more wildcards were used to specify the path names for the objects in the OS to be accessed by the query;

the database system directing the OS to provide a list containing the path names of the objects in the OS by:

the database system requesting the OS to identify containers owned by the database system, and for each container owned by the database system, requesting path names of the objects in the container and making an additional request for path names of the objects in the container after the OS provides a maximum number of path names;

the database system receiving the list and applying the one or more wildcards to identify the path names of the objects to be accessed by the query; and the database system producing a result by executing the query by accessing the objects in the OS identified by the path names of the objects to be accessed by the query.

7. The non-transitory computer-readable tangible medium of claim 6 wherein:

the path names of the objects in the OS have a plurality of logical levels including:

a container name, and a prefix;

wherein the wildcards are applied to the prefix.

8. The non-transitory computer-readable tangible medium of claim 7 wherein a first wildcard of the one or more wildcards applies to a portion of or all of a first logical level of the plurality of logical levels and a second wildcard of the one or more wildcards applies to a portion of or all of a second logical level of the plurality of logical levels.

9. The non-transitory computer-readable tangible medium of claim 7 wherein one of the one or more wildcards applies to a portion of one of the logical levels.

10. The non-transitory computer-readable tangible medium of claim 6 wherein the wildcards are used to identify objects having a same schema.

11. A system comprising:

a computer processor;

an object store access process comprising at least one process executed by the computer processor;

a database process executed by the computer processor;

the database process receiving a query that includes a reference to a foreign table, wherein the foreign table is used to access an Object Store (OS) outside the database system, wherein the OS stores objects, wherein the objects have path names, which are pointers to the objects, and wherein when the foreign table was created one or more wildcards were used to specify the path names for the objects in the OS to be accessed by the query;

the object store access process directing the OS to provide a list containing the path names of the objects in the OS by:

the database system requesting the OS to identify containers owned by the database system, and for each container owned by the database system, requesting path names of the objects in the container and making an additional request for path names of the objects in the container after the OS provides a maximum number of path names;

the database process receiving the list and applying the one or more wildcards to identify the path names of the objects to be accessed by the query; and the database process producing a result by executing the query by accessing the objects in the OS identified by the path names of the objects to be accessed by the query.

12. The system of claim 11 wherein:

the path names of the objects in the OS have a plurality of logical levels including:

a container name, and a prefix;

wherein the wildcards are applied to the prefix.

13. The system of claim 12 wherein a first wildcard of the one or more wildcards applies to a portion of or all of a first logical level of the plurality of logical levels and a second wildcard of the one or more wildcards applies to a portion of or all of a second logical level of the plurality of logical levels.

14. The system of claim 12 wherein one of the one or more wildcards applies to a portion of one of the logical levels.

15. The system of claim 11 wherein the wildcards are used to identify objects having a same schema.

* * * * *